(12) United States Patent
Nagasaki et al.

(10) Patent No.: US 8,319,430 B2
(45) Date of Patent: Nov. 27, 2012

(54) PLASMA DISPLAY PANEL AND METHOD OF MANUFACTURING PLASMA DISPLAY PANEL

(75) Inventors: Yoshihisa Nagasaki, Osaka (JP); Kazuhiko Sugimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/384,794

(22) PCT Filed: Apr. 15, 2011

(86) PCT No.: PCT/JP2011/002222
§ 371 (c)(1),
(2), (4) Date: Jan. 19, 2012

(87) PCT Pub. No.: WO2011/138850
PCT Pub. Date: Nov. 10, 2011

(65) Prior Publication Data
US 2012/0181918 A1 Jul. 19, 2012

(30) Foreign Application Priority Data
May 7, 2010 (JP) ................................. 2010-106987

(51) Int. Cl.
*H01J 17/49* (2006.01)
*H01J 9/00* (2006.01)
*C09K 11/64* (2006.01)

(52) U.S. Cl. ........................... 313/582; 313/487; 445/24

(58) Field of Classification Search ........................... None
See application file for complete search history.

(56) References Cited

U.S. PATENT DOCUMENTS

| 7,423,376 B2 * | 9/2008 | Setoguchi et al. ............ 313/582 |
| 2003/0085853 A1 | 5/2003 | Shiiki et al. |
| 2006/0017385 A1 * | 1/2006 | Tanaka et al. ................. 313/582 |
| 2006/0076879 A1 | 4/2006 | Kwon |
| 2006/0152135 A1 | 7/2006 | Choi et al. |
| 2007/0018912 A1 | 1/2007 | Shiiki et al. |
| 2009/0066230 A1 | 3/2009 | Hirosaki et al. |

FOREIGN PATENT DOCUMENTS

| JP | 10-195428 | 7/1998 |
| JP | 10-208647 | 8/1998 |

(Continued)

OTHER PUBLICATIONS

International Search Report of PCT Application No. PCT/JP2011/002222, dated Jul. 12, 2011.

*Primary Examiner* — Ashok Patel
(74) *Attorney, Agent, or Firm* — Panasonic Patent Center (57) ABSTRACT

A plasma display panel includes a front plate, a rear plate facing the front plate, and a phosphor layer formed on the rear plate. The phosphor layer includes a green phosphor layer containing $Zn_2SiO_4$:Mn and $(Y_{1-X}, Gd_X)_3Al_5O_{12}$:Ce, where $0 \leq X \leq 1$. In $Zn_2SiO_4$:Mn, the amount of Mn is no less than 8 at. % to no more than 10 at. % relative to the total amount of Zn and Mn, and the total amount of Zn and Mn is no less than 197 at. % to no more than 202 at. % relative to the amount of Si. The amount of $(Y_{1-X}, Gd_X)_3Al_5O_{12}$:Ce is no less than 20 wt. % to no more than 50 wt. % relative to the total amount of $Zn_2SiO_4$:Mn and $(Y_{1-X}, Gd_X)_3Al_5O_{12}$:Ce.

8 Claims, 1 Drawing Sheet

FOREIGN PATENT DOCUMENTS

| | | |
|---|---|---|
| JP | 11-086735 | 3/1999 |
| JP | 11-297221 | 10/1999 |
| JP | 2001-236893 | 8/2001 |
| JP | 2003-142005 | 5/2003 |
| JP | 2006-193712 | 7/2006 |
| JP | 2006-274137 | 10/2006 |
| WO | 2006/126567 | 11/2006 |

* cited by examiner

PLASMA DISPLAY PANEL AND METHOD OF MANUFACTURING PLASMA DISPLAY PANEL

CROSS-REFERENCE TO RELATED APPLICATIONS

This present application is a U.S. National stage application of international application PCT/JP2011/002222 filed on Apr. 15, 2011, and claims priority under 35 U.S.C. §119(a) to Japanese Patent Application No. 2010-106987, filed May 7, 2010, the entire contents of which are hereby incorporated herein by reference.

TECHNICAL FIELD

The present invention relates to a plasma display panel with a phosphor layer including phosphors to be excited by ultraviolet light.

BACKGROUND ART

The quality of display images on a plasma display panel (hereinafter, referred to as "PDP") varies widely depending on afterglow characteristics of a phosphor layer. The quality of display images on the PDP is better as afterglow time is shorter when the afterglow time is referred to a time period from the point where emission intensity of a phosphor layer is at a maximum to the point where it is at $\frac{1}{10}$ of the maximum.

Known green phosphors included in the phosphor layer are $Zn_2SiO_4$:Mn and $(Y, Gd)BO_3$:Tb (e.g., Patent Literatures 1, 2, 3, and 4). In order to shorten the afterglow time, these green phosphors are mixed with, for example, $(Y, Gd)Al_3(BO_3)_4$:Tb having a short afterglow time. Moreover, in order to shorten the afterglow time of $Zn_2SiO_4$:Mn itself, the concentration of the emission center manganese (Mn) is increased.

CITATION LIST

Patent Literature

Patent Literature 1 Unexamined Japanese Patent Publication No. H10-195428

Patent Literature 2 Unexamined Japanese Patent Publication No. 2006-274137

Patent Literature 3 Unexamined Japanese Patent Publication No. H11-86735

Patent Literature 4 Unexamined Japanese Patent Publication No. 2001-236893

SUMMARY OF THE INVENTION

A PDP includes a front plate, a rear plate facing the front plate, and a phosphor layer formed on the rear plate. The phosphor layer includes a green phosphor layer containing $Zn_2SiO_4$:Mn and $(Y_{1-X}, Gd_X)_3Al_5O_{12}$:Ce, where $0 \leq X \leq 1$. In $Zn_2SiO_4$:Mn, the amount of Mn is no less than 8 at. % to no more than 10 at. % relative to the total amount of Zn and Mn, and the total amount of Zn and Mn is no less than 197 at. % to no more than 202 at. % relative to the amount of Si. The amount of $(Y_{1-X}, Gd_X)_3Al_5O_{12}$:Ce is no less than 20 wt. % to no more than 50 wt. % relative to the total amount of $Zn_2SiO_4$:Mn and $(Y_{1-X}, Gd_X)_3Al_5O_{12}$:Ce.

DESCRIPTION OF EMBODIMENTS

1. Configuration of PDP

Figure 1:
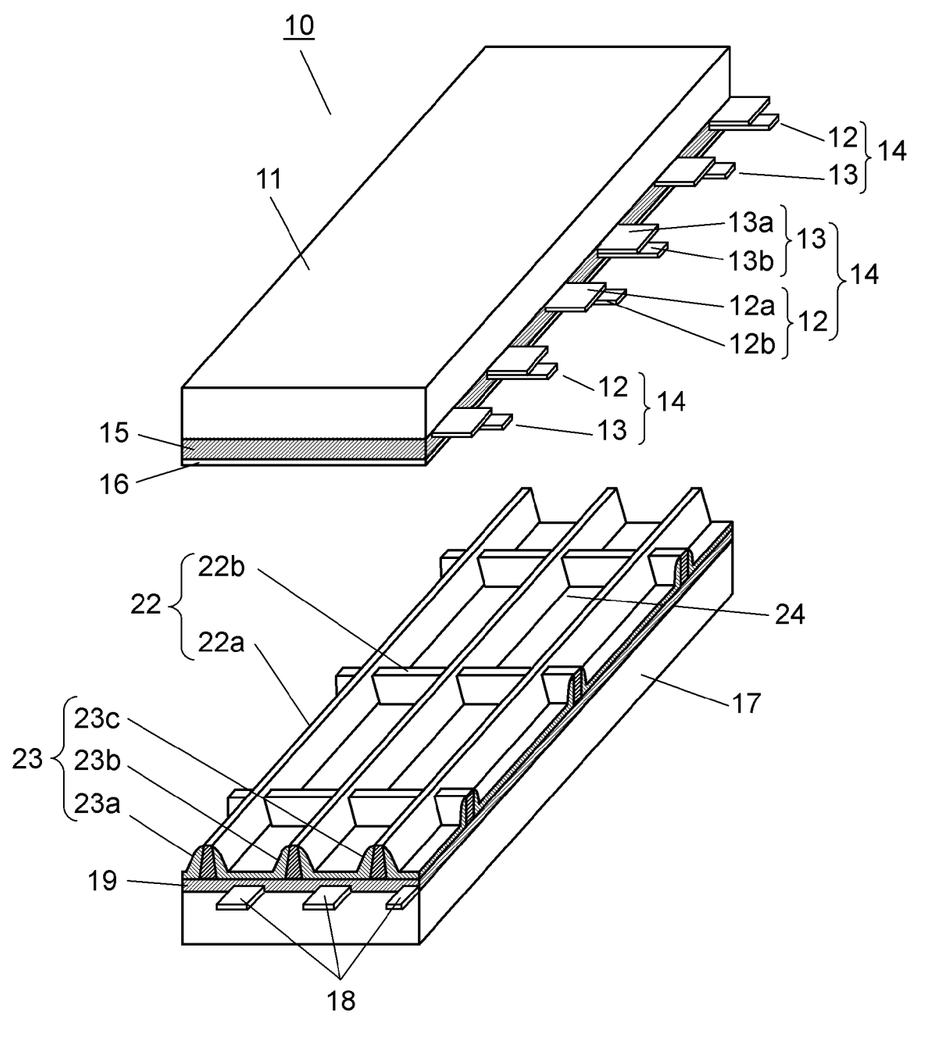
FIG. 1 is an exploded perspective view showing the configuration of a PDP according to an embodiment.

As shown in FIG. 1, PDP 10 includes front substrate 11 and rear substrate 17 facing each other.

On front substrate 11 made of glass, a plurality of display electrodes 14, each of which composed of a pair of scan electrode 12 and sustain electrode 13 placed parallel to each other, is formed. In this embodiment, scan electrode 12 and sustain electrode 13 are arranged in an order of scan electrode 12, sustain electrode 13, sustain electrode 13, and scan electrode 12. Scan electrode 12 is composed of large-width transparent electrode 12a and narrow-width bus electrode 12b laminated thereon. Similarly, sustain electrode 13 is composed of large-width transparent electrode 13a and narrow-width bus electrode 13b laminated thereon. Transparent electrodes 12a and 13a contain conductive metal oxides such as indium tin oxide (ITO), tin oxide ($SnO_2$), and zinc oxide (ZnO). Bus electrodes 12b and 13b are formed so as to increase conductivity and contain metals such as silver (Ag).

Dielectric layer 15 that covers display electrodes 14 is formed on front substrate 11. Dielectric layer 15 has a film thickness of about 40 μm. Dielectric layer 15 is made of a bismuth oxide ($Bi_2O_3$) low-melting glass or a zinc oxide (ZnO) low-melting glass.

Protective layer 16 containing magnesium oxide (MgO) is formed on dielectric layer 15. Protective layer 16 has a film thickness of about 0.8 μm. Protective layer 16 is a thin layer containing alkaline earth metal oxides mainly composed of magnesium oxide (MgO). Protective layer 16 is formed so as to protect dielectric layer 15 against ion sputtering and also stabilize discharge characteristics such as discharge starting voltage.

On rear substrate 17 made of glass, a plurality of data electrodes 18 arranged parallel to one another is formed. Data electrode 18 contains a highly conductive material mainly composed of silver (Ag).

Base dielectric layer 19 is placed such that it covers data electrodes 18. Base dielectric layer 19 is made of a bismuth oxide ($Bi_2O_3$) low-melting glass or the like. Base dielectric layer 19 may be mixed with titanium oxide ($TiO_2$) particles so as to reflect visible light.

Barrier ribs 22 are formed on base dielectric layer 19. Barrier ribs 22 are composed of longitudinal barrier ribs 22a and lateral barrier ribs 22b orthogonal to longitudinal barrier ribs 22a, with longitudinal barrier ribs 22a and lateral barrier ribs 22b arranged in parallel crosses. Barrier ribs 22 contain a low-melting glass material and the like. For example, when adjusted to a full hi-definition television with a screen size of 42 inches, the height of barrier ribs 22 is 0.1 mm to 0.15 mm, and the pitch between adjacent longitudinal barrier ribs 22a is 0.15 mm.

Phosphor layer 23 is formed on the surface of base dielectric layer 19 and the side faces of barrier ribs 22. Phosphor layer 23 includes red phosphor layer 23a that emits red light, green phosphor layer 23b that emits green light, and blue phosphor layer 23c that emits blue light. Red phosphor layer 23a, green phosphor layer 23b, and blue phosphor layer 23c are placed in order, with longitudinal barrier ribs 22a interposed therebetween.

Front substrate 11 and rear substrate 17 are placed facing each other such that display electrodes 14 and data electrodes 18 are orthogonal to each other. The periphery between front substrate 11 and rear substrate 17 is sealed with a sealing material such as a frit (not shown). Discharge space is formed between sealed front substrate 11 and rear substrate 17. In the discharge space, discharge gas including, for example, xenon (Xe) and the like is enclosed under a pressure of about $6\times10^4$ Pa. The discharge space is partitioned by barrier ribs 22 into a plurality of sections. Discharge cells 24 are formed at the locations where display electrodes 14 and data electrodes 18 are orthogonal to each other. The discharge is generated in discharge cells 24 including phosphor layer 23 of each color, whereby phosphor layer 23 of each color emits light. Thus, PDP 10 can display an image. The configuration of PDP 10 is not limited to those described above, and barrier ribs 22 may be arranged in a stripe pattern.

2. Method for Manufacturing PDP

The method for manufacturing PDP 10 includes a front plate forming step of forming display electrodes 14 and others on front substrate 11, a rear plate forming step of forming data electrodes 18 and others on rear substrate 17, and an assembling step of assembling front substrate 11 and rear substrate 17.

[2-1. Front Plate Forming Step]

In the front plate forming step, display electrodes 14 and dielectric layer 15 are formed on front substrate 11.

First, scan electrodes 12 and sustain electrodes 13 are formed on front substrate 11. For example, an ITO thin film is formed on front substrate 11 by sputtering or the like. Then, transparent electrodes 12a, 13a are formed in a predetermined pattern by lithography. The material of bus electrodes 12b, 13b is a paste containing Ag, a glass frit for binding Ag, a photosensitive resin, a solvent, and the like. The bus electrode paste is applied onto front substrate 11 such that it covers transparent electrodes 12a, 13a by screen printing or the like. Next, the solvent contained in the bus electrode paste is removed with a drying oven. Then, the bus electrode paste is exposed through a photomask having a predetermined pattern. Thereafter, the bus electrode paste is developed to form a bus electrode pattern. Then, the bus electrode pattern is fired at a predetermined temperature with a baking furnace, resulting in the removal of the photosensitive resin contained in the bus electrode pattern and the melting of the glass frit contained in the bus electrode pattern. The molten glass frit is again vitrified after the firing.

The relatively narrow area between transparent electrode 12a and transparent electrode 13a is a main gap where discharge occurs. The relatively wide area between transparent electrode 12a and transparent electrode 13a is an inter-pixel gap where discharge does not occur.

Next, dielectric layer 15 that covers display electrodes 14 is formed. The material of dielectric layer 15 is a dielectric paste containing a dielectric glass frit, a resin, a solvent, and the like. The dielectric paste is applied onto front substrate 11 such that it covers scan electrodes 12 and sustain electrodes 13 with a predetermined thickness by die coating, for example. Next, the solvent contained in the dielectric paste is removed with a drying oven. Lastly, the dielectric paste is fired at a predetermined temperature with a baking furnace, resulting in the removal of the resin contained in the dielectric paste and the melting of the dielectric glass frit contained in the dielectric paste. The molten glass frit is again vitrified after the firing. It may be possible to use methods other than the die coating of the dielectric paste, such as screen printing and spin coating. In addition, it may be possible to use a CVD (Chemical Vapor Deposition) method to form a film, which is to become dielectric layer 15.

With the front plate forming step described above, display electrodes 14 and dielectric layer 15 are formed on front substrate 11.

[2-2. Rear Plate Forming Step]

In the rear plate forming step, data electrodes 18, base dielectric layer 19, barrier ribs 22, phosphor layer 23, and a sealing material (not shown) are formed on rear substrate 17.

First, data electrodes 18 are formed on rear substrate 17. The material of data electrodes 18 is a data electrode paste containing Ag for ensuring conductivity, a glass frit for binding Ag, a photosensitive resin, a solvent, and the like. The data electrode paste is applied onto rear substrate 17 with a predetermined thickness by screen printing, for example. Next, the solvent contained in the data electrode paste is removed with a drying oven. Then, the data electrode paste is exposed through a photomask having a predetermined pattern. Thereafter, the data electrode paste is developed to form a data electrode pattern. Lastly, the data electrode pattern is fired at a predetermined temperature with a baking furnace, resulting in the removal of the photosensitive resin contained in the data electrode pattern and the melting of the glass frit contained in the data electrode pattern. The molten glass frit is again vitrified after the firing. It may be possible to use methods other than the screen printing of the data electrode paste, such as sputtering and vapor deposition.

Next, base dielectric layer 19 is formed. The material of base dielectric layer 19 is a base dielectric paste containing a dielectric glass frit, a resin, a solvent, and the like. The base dielectric paste is applied onto rear substrate 17 on which data electrodes 18 are formed such that it covers data electrodes 18 with a predetermined thickness by screen printing, for example. Then, the solvent contained in the base dielectric paste is removed with a drying oven. Lastly, the base dielectric paste is fired at a predetermined temperature with a baking furnace, resulting in the removal of the resin contained in the base dielectric paste and the melting of the dielectric glass frit contained in the base dielectric paste. The molten glass frit is again vitrified after the firing. It may be possible to use methods such as die coating and spin coating. In addition, it may be possible to use a CVD method or the like to form a film, which is to become base dielectric layer 19.

Next, barrier ribs 22 are formed by photolithography. The material of barrier ribs 22 is a barrier rib paste containing a filler, a glass frit for binding the filler, a photosensitive resin, a solvent, and the like. The barrier rib paste is applied onto base dielectric layer 19 with a predetermined thickness by die coating, for example. Then, the solvent contained in the barrier rib paste is removed with a drying oven. Thereafter, the barrier rib paste is exposed through a photomask having a predetermined pattern. Then, the barrier rib paste is developed to form a barrier rib pattern. Lastly, the barrier rib pattern is fired at a predetermined temperature with a baking furnace, resulting in the removal of the photosensitive resin contained in the barrier rib pattern and the melting of the glass frit contained in the barrier rib pattern. The molten glass frit is again vitrified after the firing. It may be possible to use methods other than the photolithography, such as sandblasting.

Next, phosphor layer 23 is formed. The material of phosphor layer 23 is a phosphor paste containing a phosphor material, a binder, a solvent, and the like. The phosphor paste is applied between adjacent barrier ribs 22 with a predetermined thickness by dispensing, for example. That is, the phosphor paste is applied onto base dielectric layer 19 and the side faces of barrier ribs 22 between barrier ribs 22. Then, the solvent contained in the phosphor paste is removed with a drying oven. Lastly, the phosphor paste is fired at a predetermined temperature with a baking furnace, resulting in the removal of the resin contained in the phosphor paste. It may be possible to use methods other than the dispensing, such as screen printing and inkjetting. The phosphor material will be described in detail later.

Lastly, a sealing material is formed on the peripheral edge of rear substrate 17. The material of the sealing material is a sealing paste containing a glass frit, a binder, a solvent, and the like. The sealing paste is applied onto the peripheral edge of rear substrate 17 by dispensing or the like. Then, the solvent contained in the sealing paste is removed with a drying oven.

With the rear plate forming step described above, data electrodes 18, base dielectric layer 19, barrier ribs 22, phosphor layer 23, and a sealing material are formed on rear substrate 17.

[2-3. Assembling Step]

In the assembling step, front substrate 11 on which display electrodes 14 and others are formed and rear substrate 17 on which data electrodes 18 and others are formed are assembled together.

First, front substrate 11 and rear substrate 17 are placed facing each other such that display electrodes 14 and data electrodes 18 are orthogonal to each other. Then, front substrate 11 and rear substrate 17 are fixed with a clip or the like. Fixed front substrate 11 and rear substrate 17 are transferred into a sealing oven. Rear substrate 17 has an exhaust hole with an exhaust tube provided thereon. The exhaust tube is communicated with the discharge space via the exhaust hole. The exhaust tube is connected to an exhausting device for exhausting gas from PDP 10 and a discharge-gas-introducing device for introducing discharge gas into PDP 10. The sealing material is, for example, a low-melting glass having a softening temperature of 380° C. Front substrate 11 and rear substrate 17 are heated to a temperature higher than the softening temperature of the sealing material of 380° C., for example, to about 420° C. Front substrate 11 and rear substrate 17 are maintained at the temperature for about 10 minutes, thereby allowing the sealing material to melt sufficiently. Then, front substrate 11 and rear substrate 17 are cooled to a temperature lower than the softening temperature of the sealing material, for example, to about 300° C., thereby they are sealed together. Next, the discharge space is exhausted until the pressure inside reaches about $1 \times 10^{-4}$ Pa. Thereafter, discharge gas is introduced into the discharge space with a discharge-gas-introducing device. As the discharge gas, for example, a mixed gas of Ne and Xe is enclosed under a pressure of about $6 \times 10^4$ Pa. Lastly, the exhaust tube is sealed. Then, front substrate 11 and rear substrate 17 are taken out from the sealing oven.

With the step described above, PDP 10 is completed.

3. Phosphor Material

In this embodiment, blue phosphor layer 23c is made of a blue phosphor material, for example, $BaMgAl_{10}O_{17}$:Eu having a short afterglow time. Red phosphor layer 23a is made of a red phosphor material containing, for example, at least one of a (Y, Gd)(P, V)$O_4$:Eu phosphor or a $Y_2O_3$:Eu phosphor. Green phosphor layer 23b is made of a green phosphor material containing $Zn_2SiO_4$:Mn and $(Y_{1-X}, Gd_X)_3Al_5O_{12}$:Ce, where $0 \leq X \leq 1$, or a green phosphor material containing $Zn_2SiO_4$:Mn and $(Y_{1-x}, Gd_x)_3(Al_{1-y}, Ga_y)_5O_{12}$:Ce, where $0 \leq x \leq 1$ and $0 \leq y \leq 0.5$.

[3-1. Method for Manufacturing Phosphor Material]

In this embodiment, the phosphor materials are made by a solid phase reaction.

As the blue phosphor material, $BaMgAl_{10}O_{17}$:Eu is prepared as follows. Barium carbonate ($BaCO_3$), magnesium carbonate ($MgCO_3$), aluminum oxide ($Al_2O_3$), and europium oxide ($Eu_2O_3$) are mixed so as to meet the composition of the phosphor. The mixture is fired at 800° C. to 1200° C. in air and thereafter fired at 1200° C. to 1400° C. in a mixed gas atmosphere of hydrogen and nitrogen.

As the red phosphor material, (Y, Gd)(P, V)$O_4$:Eu is prepared as follows. Yttrium oxide ($Y_2O_3$), gadolinium oxide ($Gd_2O_3$), vanadium oxide ($V_2O_5$), phosphorus pentoxide ($P_2O_5$), and europium oxide ($EuO_2$) are mixed so as to meet the composition of the phosphor. The mixture is fired at 600° C. to 800° C. in air and thereafter fired at 1000° C. to 1200° C. in a mixed gas atmosphere of oxygen and nitrogen. As the red phosphor material, $Y_2O_3$:Eu and the like may be prepared by similar methods.

As the green phosphor material, a phosphor material of $Zn_2SiO_4$:Mn and $(Y_{1-X}, Gd_X)_3Al_5O_{12}$:Ce mixed together is prepared. The method for manufacturing the green phosphor material will be explained in detail later. $Zn_2SiO_4$:Mn is prepared such that the amount of Mn is no less than 8 at. % to no more than 10 at. % relative to the total amount of Zn and Mn. Also, $Zn_2SiO_4$:Mn is prepared such that the total amount of Zn and Mn is no less than 197 at. % to no more than 202 at. % relative to the amount of Si. The phosphor material is prepared such that the amount of $(Y_{1-X}, Gd_X)_3Al_5O_{12}$:Ce is no less than 20 wt. % to no more than 50 wt. % relative to the total amount of $Zn_2SiO_4$:Mn and $(Y_{1-X}, Gd_X)_3Al_5O_{12}$:Ce.

In addition, a phosphor material of $Zn_2SiO_4$:Mn and $(Y_{1-x}, Gd_x)_3(Al_{1-y}, Ga_y)_5O_{12}$:Ce mixed together may be prepared. In this case, the phosphor material is prepared such that the amount of $(Y_{1-x}, Gd_x)_3(Al_{1-y}, Ga_y)_5O_{12}$:Ce is no less than 30 wt. % to no more than 80 wt. % relative to the total amount of $Zn_2SiO_4$:Mn and $(Y_{1-x}, Gd_x)_3(Al_{1-y}, Ga_y)_5O_{12}$:Ce.

The amounts of Zn, Mn, and Si are measured by X-ray Photoelectron Spectroscopy within the top 10 nm of the particle surface of $Zn_2SiO_4$:Mn. The X-ray Photoelectron Spectroscopy is a method for studying the state of elements within the near-surface, top 10 nm, of a substance. For X-ray Photoelectron Spectroscopy, for example, a scanning photoelectron spectrometer (manufactured by ULVAC-PHI Inc.) is used. The amounts of Zn, Mn, and Si are values calculated based on the atomic ratio of Zn, Mn, and Si according to X-ray Photoelectron Spectroscopy. That is, the amount of Mn relative to the total amount of Zn and Mn is expressed by [Mn/(Zn+Mn)×100 (at. %)]. The total amount of Zn and Mn relative to the amount of Si is expressed by [(Zn+Mn)/Si×100 (at. %)].

It is preferable that $Zn_2SiO_4$:Mn has an average diameter greater than that of $(Y_{1-x}, Gd_x)_3Al_5O_{12}$:Ce, because this results in a relative improvement in the luminance of PDP 10. $(Y_{1-x}, Gd_x)_3Al_5O_{12}$:Ce has characteristics of absorbing visible light, as well as characteristics of less likely to absorb visible light as the particle diameter is smaller. Thus, the above configuration makes it possible to suppress that $(Y_{1-x}, Gd_x)_3(Al_{1-y}, Ga_y)_5O_{12}$:Ce absorbs visible light of green emission from $Zn_2SiO_4$:Mn and $(Y_{1-x}, Gd_x)_3(Al_{1-y}, Ga_y)_5O_{12}$:Ce. In this embodiment, $Zn_2SiO_4$:Mn has an average diameter (D50) of no less than 2 μm to no more than 3 μm. $(Y_{1-x}, Gd_x)_3Al_5O_{12}$:Ce and $(Y_{1-x}, Gd_x)_3(Al_{1-y}, Ga_y)_5O_{12}$:Ce have an average diameter (D50) of no less than 1 μm to no more than 3 μm.

[3-2. Method for Manufacturing Green Phosphor Material]

Hereinafter, the method for manufacturing $Zn_2SiO_4:Mn$, $(Y_{1-x}, Gd_x)_3Al_5O_{12}:Ce$, and $(Y_{1-x}, Gd_x)_3(Al_{1-y}, Ga_y)_5O_{12}:Ce$ will be explained in detail.

(1) Method for Manufacturing $Zn_2SiO_4:Mn$ $Zn_2SiO_4:Mn$ is prepared by a solid phase reaction, a liquid phase method, or a liquid spraying method. The solid phase reaction is a method of firing an oxide or carbonate material and a flux to prepare a phosphor material. The liquid phase method is a method of heating a phosphor precursor material to prepare a phosphor material. The phosphor precursor material is produced by subjecting an organometallic salt or nitrate to hydrolysis in an aqueous solution and adding alkali or the like as needed, thereby forming a precipitate. The liquid spraying method is a method of spraying an aqueous solution containing raw materials of a phosphor material into a heated oven to prepare a phosphor material.

$Zn_2SiO_4:Mn$ in this embodiment is not particularly affected by the preparing method. As one example thereof, a method for manufacturing $Zn_2SiO_4:Mn$ by a solid phase reaction will be described herein.

First, Zinc oxide (ZnO), silicon dioxide ($SiO_2$), and manganese carbonate ($MnCO_3$) are used as raw materials.

As a material that supplies zinc in $Zn_2SiO_4:Mn$ (hereinafter, referred to as "Zn material"), zinc oxide with high purity (purity 99% or more) is directly used. Other than such a method of directly using zinc oxide, it may be possible to use a method of obtaining zinc oxide indirectly by a firing step during the manufacturing process. In that case, high purity (purity 99% or more) zinc hydroxide, zinc carbonate, zinc nitrate, zinc halide, zinc oxalate or the like is used.

As a material that supplies silicon in $Zn_2SiO_4:Mn$ (hereinafter, referred to as "Si material"), silicon dioxide, for example one with high purity (purity 99% or more), is used. Moreover, hydroxides of silicon that are obtained by hydrolyzing silicon alkoxide compounds such as ethyl silicate may be used.

Conventional methods are characterized by excessively mixing the Si material among the above-described materials in a composition ratio above the stoichiometric ratio to obtain a phosphor with high luminance. However, the manufacturing method of this embodiment is different from the conventional methods and characterized by excessively mixing the Zn material in a composition ratio above the stoichiometric ratio.

As a material that supplies manganese in $Zn_2SiO_4:Mn$ (hereinafter, referred to as "Mn material"), other than manganese carbonate, it may be possible to use manganese hydroxide, manganese nitrate, manganese halides, or manganese oxalate. These Mn materials employ a method of providing manganese oxide indirectly by a firing step during the manufacturing process. Of course, manganese oxide may be used directly.

In this embodiment, one specific example of mixing of raw materials is 0.16 mol of $MnCO_3$, 1.86 mol of ZnO, and 1.00 mol of $SiO_2$. In $Zn_2SiO_4:Mn$ prepared with this mixing ratio, the amount of Mn is 8 at. % relative to the total amount of Zn and Mn, and the total amount of Zn and Mn is 202 at. % relative to the amount of Si.

A V-type mixer, a stirrer, or the like is used to mix the Mn material, the Zn material, and the Si material. For example, in the case that a ball mill having a pulverizing function is used, the Mn material, the Zn material, and the Si material are mixed for 1 hour at 40° C. Thus, mixed powder of the phosphor material is prepared. Here, a vibration mill or a jet mill may be used.

Next, the mixed powder of the phosphor material is fired in an air atmosphere. First, the mixed powder is heated to a maximum temperature of 1200° C. after about 6 hours from the start of the firing and maintained at the maximum temperature for 4 hours. Thereafter, the mixed powder is cooled over about 12 hours. Thus, powder of $Zn_2SiO_4:Mn$ is prepared.

The atmosphere at the time of firing is not limited to the air atmosphere and may be a nitrogen atmosphere or a mixed atmosphere of nitrogen and hydrogen. The maximum temperature is preferably in the range of 1100° C. to 1350° C. The maintaining time of the maximum temperature, the heating time, and the cooling time may be changed appropriately.

(2) Method for Manufacturing $(Y_{1-x}, Gd_x)_3Al_5O_{12}:Ce$ $(Y_{1-x}, Gd_x)_3Al_5O_{12}:Ce$ is prepared by a solid phase reaction, a liquid phase method, or a liquid spraying method. As one example thereof, a method for manufacturing $(Y_{1-x}, Gd_x)_3 Al_5O_{12}:Ce$ by a solid phase reaction will be described. Yttrium oxide ($Y_2O_3$), gadolinium oxide ($Gd_2O_3$), aluminum oxide ($Al_2O_3$), and cerium oxide ($CeO_2$) are mixed so as to meet the composition of the phosphor. A V-type mixer, a stirrer, or the like is used to mix these materials. For example, in the case that a ball mill having a pulverizing function is used, these materials are mixed for 1 hour at 40° C. Thus, mixed powder of the phosphor material is prepared. Here, a vibration mill or a jet mill may be used.

Next, the mixed powder of the phosphor material is fired in an air atmosphere. First, the mixed powder is heated to a maximum temperature of 1100° C. after about 3 hours from the start of the firing and maintained at the maximum temperature for 4 hours. Thereafter, the mixed powder is cooled over about 3 hours. The atmosphere at the time of firing is not limited to the air atmosphere and may be a nitrogen atmosphere or a mixed atmosphere of nitrogen and hydrogen. The maximum temperature is preferably in the range of 1000° C. to 1200° C. The maintaining time of the maximum temperature, the heating time, and the cooling time may be changed appropriately.

Further, the mixed powder is fired in a mixed gas atmosphere of oxygen and nitrogen. First, the mixed powder is heated to a maximum temperature of 1300° C. after about 3 hours from the start of the firing and maintained at the maximum temperature for 4 hours. Thereafter, the mixed powder is cooled over about 3 hours. The atmosphere at the time of firing is not limited to the air atmosphere and may be a nitrogen atmosphere or a mixed atmosphere of nitrogen and hydrogen. The maximum temperature is preferably in the range of 1200° C. to 1400° C. The maintaining time of the maximum temperature, the heating time, and the cooling time may be changed appropriately. Thus, powder of $(Y_{1-x}, Gd_x)_3 Al_5O_{12}:Ce$ is prepared.

(3) Method for Manufacturing $(Y_{1-x}, Gd_x)_3(Al_{1-y}, Ga_y)_5O_{12}:Ce$ $(Y_{1-x}, Gd_x)_3(Al_{1-y}, Ga_y)_5O_{12}:Ce$ is prepared by a solid phase reaction, a liquid phase method, or a liquid spraying method. As one example thereof, a method for manufacturing $(Y_{1-x}, Gd_x)_3(Al_{1-y}, Ga_y)_5O_{12}:Ce$ by a solid phase reaction will be described. Yttrium oxide ($Y_2O_3$), gadolinium oxide ($Gd_2O_3$), aluminum oxide ($Al_2O_3$), cerium oxide ($CeO_2$), and gallium oxide ($Ga_2O_3$) are mixed so as to meet the composition of the phosphor. A V-type mixer, a stirrer, or the like is used to mix these materials. For example, in the case that a ball mill having a pulverizing function is used, these materials are mixed for 1 hour at 40° C. Thus, mixed powder of the phosphor material is prepared. Here, a vibration mill or a jet mill may be used.

Next, the mixed powder of the phosphor material is fired in an air atmosphere. First, the mixed powder is heated to a maximum temperature of 1100° C. after about 3 hours from the start of the firing and maintained at the maximum temperature for 4 hours. Thereafter, the mixed powder is cooled over about 3 hours. The atmosphere at the time of firing is not limited to the air atmosphere and may be a nitrogen atmosphere or a mixed atmosphere of nitrogen and hydrogen. The maximum temperature is preferably in the range of 1000° C. to 1200° C. The maintaining time of the maximum temperature, the heating time, and the cooling time may be changed appropriately.

Further, the mixed powder is fired in a mixed gas atmosphere of oxygen and nitrogen. The mixed powder is heated to a maximum temperature of 1300° C. after about 3 hours from the start of the firing and maintained at the maximum temperature for 4 hours. Thereafter, the mixed powder is cooled over about 3 hours. The atmosphere at the time of firing is not limited to the air atmosphere and may be a nitrogen atmosphere or a mixed atmosphere of nitrogen and hydrogen. The maximum temperature is preferably in the range of 1200° C. to 1400° C. The maintaining time of the maximum temperature, the heating time, and the cooling time may be changed appropriately. Thus, powder of $(Y_{1-x}, Gd_x)_3(Al_{1-y}, Ga_y)_5O_{12}$:Ce is prepared.

The thus-prepared $Zn_2SiO_4$:Mn and $(Y_{1-x}, Gd_x)_3Al_5O_{12}$:Ce are mixed at a predetermined mixing ratio. Alternatively, $Zn_2SiO_4$:Mn and $(Y_{1-x}, Gd_x)_3(Al_{1-y}, Ga_y)_5O_{12}$:Ce are mixed at a predetermined mixing ratio. These mixed powders are each mixed with a binder, a solvent, and the like, and thus a phosphor paste is prepared.

4. Experiment 1

The present inventors have performed the following Experiment 1 using samples of PDPs 10 prepared by the manufacturing method described above in order to confirm characteristics of the green phosphor material. In Experiment 1, $Zn_2SiO_4$:Mn and $Y_3Al_5O_{12}$:Ce are used as the green phosphor material. $Zn_2SiO_4$:Mn has an average particle diameter (D50) of 2 μm. $Y_3Al_5O_{12}$:Ce has an average particle diameter (D50) of 2 μm. In Experiment 1, samples 1 to 10 are prepared, with three conditions being changed. The first condition is [Mn/(Zn+Mn)×100 (at. %)] in $Zn_2SiO_4$:Mn. The second condition is [(Zn+Mn)/Si×100 (at. %)] in $Zn_2SiO_4$:Mn. The third condition is a mixing ratio (wt. %) of $(Y_{1-x}, Gd_x)_3Al_5O_{12}$:Ce, that is, the amount of $(Y_{1-x}, Gd_x)_3Al_5O_{12}$:Ce relative to the total amount of $Zn_2SiO_4$:Mn and $(Y_{1-x}, Gd_x)_3Al_5O_{12}$:Ce.

Here, $(Y_{1-x}, Gd_x)_3Al_5O_{12}$:Ce used in Experiment 1 is the one where X=1; however, those where 0≦X≦1 can achieve the same effect.

In Experiment 1, prepared samples 1 to 10 are measured in terms of luminance, color reproduction range, afterglow time, and address voltage. For the measurement, plasma display devices prepared by connecting PDPs 10 of samples 1 to 10 with a drive circuit and the like are used. The present inventors have evaluated prepared samples 1 to 10 based on the measurement values. In order to evaluate samples 1 to 10, a plasma display device prepared by using a conventional PDP is used as a comparative example. Then, comparison between the measurement values of the comparative example and those of the samples is made. Table 1 shows evaluation results of samples 1 to 10. Samples 1 to 10 are evaluated for each item as follows. Here, the first condition and the second condition are adjusted by controlling the mixing ratio of the Mn material, the Zn material, and the Si material, firing conditions, and the like.

TABLE 1

| | $Zn_2SiO_4$:Mn | | | PDP evaluation result | | | |
|---|---|---|---|---|---|---|---|
| | Mn/(Zn + Mn) × 100 (at %) | (Zn + Mn)/Si × 100 (at %) | $Y_3Al_5O_{12}$:Ce Mixing ratio (wt %) | Luminance (value relative to Comp. Example) | Color reproduction (value relative to Comp. Example) | Afterglow characteristics (ms) | Discharge characteristics (difference relative to Comp. Example: V) |
| Comp. Example | 4.5 | 196 | 0 | 100 | 100 | 9.2 | 0 |
| Sample 1 | 6 | 196 | 10 | Good 100 | Good 95 | Bad 8.8 | Bad 5 |
| Sample 2 | 10 | 204 | 8 | Bad 88 | Excellent 106 | Good 2.1 | Bad 3 |
| Sample 3 | 8 | 196 | 20 | Bad 89 | Excellent 101 | Good 2.8 | Bad 3 |
| Sample 4 | 8 | 197 | 20 | Good 94 | Good 100 | Good 2.8 | Good 1 |
| Sample 5 | 8 | 200 | 20 | Good 93 | Good 100 | Good 2.9 | Good 1 |
| Sample 6 | 8 | 202 | 20 | Good 92 | Excellent 101 | Good 3 | Excellent −2 |
| Sample 7 | 8 | 203 | 20 | Bad 88 | Good 99 | Good 2.7 | Excellent −1 |
| Sample 8 | 8 | 200 | 50 | Good 95 | Good 90 | Excellent 1.8 | Excellent −3 |
| Sample 9 | 8 | 200 | 60 | Good 96 | Bad 86 | Excellent 1.5 | Excellent −5 |
| Sample 10 | 10 | 200 | 20 | Good 91 | Good 99 | Excellent 1.9 | Excellent −1 |

[4-1. Evaluation of Luminance]

The luminance is evaluated by measuring the luminance of a plasma display device when allowing only green phosphor layer 23b to emit light, thereby only the green light is lit. Table 1 shows the luminance of samples 1 to 10 as a value relative to that of the comparative example which is set to be 100. In Experiment 1, since a luminance of 90 or more is the luminance that can be applied in practical use, the samples with a luminance of 90 or more are evaluated as "good". The samples with a luminance of less than 90 are evaluated as "bad". The samples with a luminance of more than 100 are evaluated as "excellent" since they are more preferable in practical use.

As shown in Table 1, samples 1, 4 to 6, and 8 to 10 have a luminance of 90 or more and thus are preferable. Samples 5 and 10 are changed only in the first condition, with the second condition fixed to 200 at. % and the third condition fixed to 20 wt. %. In these conditions, it is confirmed that the luminance lowers as the first condition increases. It is also confirmed that the luminance is 91 when the first condition is 10 at. %. Accordingly, in these conditions, it is considered that the luminance is less than 90 when the first condition is more than 10 at. %. Thus, in these conditions, a PDP with the first condition of more than 10 at. % is not preferable. Samples 3 to 7 are changed only in the second condition, with the first condition fixed to 8 at. % and the third condition fixed to 20 wt. %. In these conditions, it is confirmed that the luminance is less than 90 when the second condition is less than 197 at.

%. It is also confirmed that the luminance is less than 90 when the second condition is more than 202 at. %. Thus, in these conditions, a PDP with the second condition of no less than 197 at. % to no more than 202 at. % is preferable. Samples 5, 8, and 9 are changed only in the third condition, with the first condition fixed to 8 at. % and the second condition fixed to 200 at. %. In these conditions, it is confirmed that the luminance increases slightly as the third condition increases. Thus, it is preferable that the mixing ratio of $Y_3Al_5O_{12}$:Ce is greater, from the viewpoint of luminance.

[4-2. Evaluation of Color Reproduction]

The color reproduction is evaluated by measuring the color reproduction range. The color reproduction range is an area of a triangle defined by points of red, green, and blue on xy chromaticity coordinates in which the single colors of red, green, and blue are lit in a plasma display device respectively and the chromaticity at the time thereof is drawn. Table 1 shows the color reproduction range of the samples as a value relative to that of the comparative example which is set to be 100. In Experiment 1, since a color reproduction range of 90 or more satisfies the chromaticity standard of High Definition Television (HDTV), the samples with a color reproduction range of 90 or more are evaluated as "good". The samples with a color reproduction range of less than 90 are evaluated as "bad". The samples with a color reproduction range of more than 100 are evaluated as "excellent" since they are more preferable in practical use.

As shown in Table 1, samples 1 to 8, and 10 have a color reproduction range of 90 or more and thus are preferable. Samples 2, 3 and 6 have a color reproduction range of more than 100 and thus are more preferable. In samples 5 and 10, it is confirmed that the color reproduction range hardly changes compared to the comparative example when the first condition is no less than 8 at. % to no more than 10 at. % in the conditions where the second condition is 200 at. % and the third condition is 20 wt. %. In samples 3 to 7, it is confirmed that the color reproduction range hardly changes compared to the comparative example when the second condition is no less than 196 at. % to no more than 203 at. % in the conditions where the first condition is 8 at. % and the third condition is 20 wt. %. In samples 5, 8, and 9, it is confirmed that the color reproduction range decreases significantly when the third condition increases in the conditions where the first condition is 8 at. % and the second condition is 200 at. %. In these conditions, it is confirmed that the color reproduction range is 90 when the third condition is 50 wt. % and it is 86 when the third condition is 60 wt. %. Thus, in these conditions, it is confirmed that a PDP with the third condition of more than 50 wt. % is not preferable in practical use.

[4-3. Evaluation of Afterglow Characteristics]

The afterglow characteristics are evaluated by measuring the afterglow time after completion of a sustain discharge in a plasma display device when only the green light is lit. The afterglow time is, when the point where the emission amount at the time of completion of a sustain discharge is at a maximum is set to be 0, a time period (ms) from the point where the emission amount is at the maximum to the point where it is at 1/10 of the maximum. In Experiment 1, since an afterglow time of 3 ms or less is the afterglow time that can be applied in practical use for a stereoscopic three-dimensional (3D) television, the samples with an afterglow time of 3 ms or less are evaluated as "good". The samples with an afterglow time of longer than 3 ms are evaluated as "bad". The samples with an afterglow time of shorter than 2 ms are evaluated as "excellent" since they are more preferable in practical use.

As shown in Table 1, samples 2 to 10 have an afterglow time of 3 ms or less and thus are preferable. Samples 8 to 10 have an afterglow time of shorter than 2 ms and thus are more preferable. In samples 2 to 10, it is confirmed that the afterglow time is 3 ms or less when $Y_3Al_5O_{12}$:Ce is mixed and the first condition is 8 at. % or more. In samples 5 and 10, it is confirmed that the afterglow time decreases significantly when the first condition increases in the conditions where the second condition is 200 at. % and the third condition is 20 wt. %. It is also confirmed that the afterglow time is 2.9 when the first condition is 8 at. %. Accordingly, in these conditions, it is considered that the afterglow time is more than 3 ms when the first condition is less than 8 at. %. Thus, in these conditions, a PDP with the first condition of less than 8 at. % is not preferable. In samples 3 to 7, it is confirmed that the afterglow time is 3 ms or less when the second condition is no less than 196 at. % to no more than 203 at. % in the conditions where the first condition is 8 at. % and the third condition is 20 wt. %. In samples 5, 8 and 9, it is confirmed that the afterglow time decreases significantly when the third condition increases in the conditions where the first condition is 8 at. % and the second condition is 200 at. %. Thus, it is preferable that the mixing ratio of $Y_3Al_5O_{12}$:Ce is greater, from the viewpoint of afterglow characteristics.

[4-4. Evaluation of Discharge Characteristics]

The discharge characteristics are evaluated by measuring the voltage applied to an address electrode (hereinafter, address voltage) required to generate a stable address discharge in a plasma display device. Table 1 shows the address voltage of the samples as a difference relative to that of the comparative example. In Experiment 1, since the samples with an address voltage of +1 V or less can be applied in practical use, they are evaluated as "good". The samples with an address voltage of more than +1 V are evaluated as "bad". Moreover, in a three-dimensional television and an ultra high definition television which require application of an address voltage at high speed, power consumption due to the address discharge increases. For example, in a three-dimensional television, power consumption due to the address discharge increases with the square of the address voltage. Thus, the samples with an address voltage of less than −1 V are evaluated as "excellent" since they are more preferable in practical use.

As shown in Table 1, samples 4 to 10 have an address voltage of +1 V or less and thus are preferable. Samples 6 to 10 have an address voltage of −1 V or less and thus are more preferable. In samples 5 and 10, it is confirmed that the address voltage decreases when the first condition increases in the conditions where the second condition is 200 at. % and the third condition is 20 wt. %. It is also confirmed that the address voltage is +1 V when the first condition is 8 at. %. Accordingly, in these conditions, it is considered that the address voltage is more than +1 V when the first condition is less than 8 at. %. Thus, in these conditions, a PDP with the first condition of less than 8 at. % is not preferable. In samples 3 to 7, it is confirmed that the address voltage is more than +1 V when the second condition is 196 at. % or less in the conditions where the first condition is 8 at. % and the third condition is 20 wt. %. Thus, in these conditions, a PDP with the second condition of 196 at. % or less is not preferable. In these conditions, it is also confirmed that the address voltage is +1 V or less when the second condition is no less than 197 at. % to no more than 203 at. %. In samples 5, 8 and 9, it is confirmed that the address voltage decreases significantly when the third condition increases in the conditions where the first condition is 8 at. % and the second condition is 200 at. %. Thus, it is preferable that the mixing ratio of $Y_3Al_5O_{12}$:Ce is greater, from the viewpoint of discharge characteristics.

[4-5. Comprehensive Evaluation]

As shown in Table 1, samples 4 to 6, 8 and 10 can decrease the afterglow time to 3 ms or less, while making the luminance to 90 or more and the color reproduction range to 90 or more and suppressing the address voltage to the maximum of +1 V. That is, the samples with the first condition of no less than 8 at. % to no more than 10 at. %, the second condition of no less than 197 at. % to no more than 202 at. %, and the third condition of no less than 20 wt. % to no more than 50 wt. % are preferable in practical use. Accordingly, since samples 4 to 6, 8 and 10 can shorten the afterglow time without significantly decreasing other performances, they can achieve PDP 10 suitable for stereoscopic image display.

Moreover, when at least one of a (Y, Gd)(P, V)O$_4$:Eu phosphor and a Y$_2$O$_3$:Eu phosphor is included in red phosphor layer 23a and a BaMgAl$_{10}$O$_{17}$:Eu phosphor is included in blue phosphor layer 23c, all of the afterglow times of red phosphor layer 23a, green phosphor layer 23b, and blue phosphor layer 23c are shortened. As a result, PDP 10 with excellent image display quality of the stereoscopic image display is achieved. Such PDP 10 is useful for an image display device such as a television for three-dimensional image display.

5. Experiment 2

The present inventors have performed the following Experiment 2 using samples of PDPs 10 prepared by the manufacturing method described above in order to confirm characteristics of the green phosphor material. In Experiment 2, Zn$_2$SiO$_4$:Mn and Y$_3$(Al$_{0.8}$, Ga$_{0.2}$)$_5$O$_{12}$:Ce are used as the green phosphor. Zn$_2$SiO$_4$:Mn has an average particle diameter (D50) of 2 μm. Y$_3$(Al$_{0.8}$, Ga$_{0.2}$)$_5$O$_{12}$:Ce has an average particle diameter (D50) of 2 μm. In Experiment 2, samples 11 to 20 are prepared, with three conditions being changed, in the same manner as in Experiment 1. The first condition and the second condition are the same as in Experiment 1. The third condition is a mixing ratio (wt. %) of Y$_3$(Al$_{0.8}$, Ga$_{0.2}$)$_5$O$_{12}$:Ce, that is, the amount of Y$_3$Al$_{0.8}$, Ga$_{0.2}$)$_5$O$_{12}$:Ce relative to the total amount of Zn$_2$SiO$_4$:Mn and Y$_3$(Al$_{0.8}$, Ga$_{0.2}$)$_5$O$_{12}$:Ce. Here, (Y$_{1-x}$, Gd$_x$)$_3$(Al$_{1-y}$, Ga$_y$)$_5$O$_{12}$:Ce used in Experiment 2 is the one where x=0 and y=0.2; however, those where 0≦x≦1 and 0≦y≦0.5 can achieve the same effect.

In Experiment 2, prepared samples 11 to 20 are measured in terms of luminance, chromaticity, afterglow time, and address discharge voltage in the same manner as in Experiment 1. The present inventors have evaluated the prepared samples based on the measurement values in the same manner as in Experiment 1. Table 2 shows evaluation results of samples 11 to 20. Samples 11 to 20 are evaluated for each item in the same manner as in Experiment 1.

TABLE 2

| | Zn$_2$SiO$_4$:Mn | | | PDP evaluation result | | | |
|---|---|---|---|---|---|---|---|
| | Mn/(Zn + Mn) × 100 (at %) | (Zn + Mn)/Si × 100 (at %) | Y$_3$(Al$_{0.8}$Ga$_{0.2}$)$_5$O$_{12}$:Ce Mixing ratio (wt %) | Luminance (value relative to Comp. Example) | Color reproduction (value relative to Comp. Example) | Afterglow characteristics (ms) | Discharge characteristics (difference relative to Comp. Example: V) |
| Comp. Example | 4.5 | 196 | 0 | 100 | 100 | 9.2 | 0 |
| Sample 11 | 6 | 196 | 20 | Good 100 | Good 96 | Bad 5.2 | Good 1 |
| Sample 12 | 10 | 204 | 15 | Bad 88 | Excellent 106 | Good 2.1 | Bad 2 |
| Sample 13 | 8 | 196 | 30 | Bad 88 | Good 100 | Good 2.3 | Bad 2 |
| Sample 14 | 8 | 197 | 30 | Good 93 | Good 100 | Good 2.3 | Excellent −1 |
| Sample 15 | 8 | 200 | 30 | Good 92 | Good 100 | Good 2.4 | Excellent −2 |
| Sample 16 | 8 | 202 | 30 | Good 94 | Excellent 101 | Good 2.3 | Excellent −2 |
| Sample 17 | 8 | 203 | 30 | Bad 88 | Good 99 | Good 2.2 | Excellent −1 |
| Sample 18 | 8 | 200 | 65 | Excellent 101 | Good 92 | Excellent 1.8 | Excellent −4 |
| Sample 19 | 8 | 200 | 80 | Good 100 | Good 90 | Excellent 1.6 | Excellent −6 |
| Sample 20 | 10 | 200 | 30 | Good 93 | Good 98 | Excellent 1.8 | Excellent −3 |

[5-1. Evaluation of Luminance]

As shown in Table 2, samples 11, 14 to 16, and 18 to 20 have a luminance of 90 or more and thus are preferable. Sample 18 has a luminance of more than 100 and thus is more preferable. Samples 15 and 20 are changed only in the first condition, with the second condition fixed to 200 at. % and the third condition fixed to 30 wt. %. In these conditions, it is confirmed that the first condition affects the luminance only a little. Samples 13 to 17 are changed only in the second condition, with the first condition fixed to 8 at. % and the third condition fixed to 30 wt. %. In these conditions, it is confirmed that the luminance is less than 90 when the second condition is less than 197 at. %. It is also confirmed that the luminance is less than 90 when the second condition is more than 202 at. %. Thus, in these conditions, a PDP with the second condition of no less than 197 at. % to no more than 202 at. % is preferable. Samples 15, 18, and 19 are changed only in the third condition, with the first condition fixed to 8 at. % and the second condition fixed to 200 at. %. In these conditions, it is confirmed that the luminance is maintained when the third condition is 65 wt. % or more. Thus, it is preferable that the mixing ratio of Y$_3$(Al$_{0.8}$, Ga$_{0.2}$)$_5$O$_{12}$:Ce is 65 wt. % or more, from the viewpoint of luminance.

[5-2. Evaluation of Color Reproduction]

As shown in Table 2, samples 11 to 20 have a color reproduction range of 90 or more and thus are preferable. Samples 12 and 16 have a color reproduction range of more than 100 and thus are more preferable. In samples 13 to 17, it is confirmed that the color reproduction range hardly changes when the second condition is no less than 196 at. % to no more than 203 at. % in the conditions where the first condition is 8 at. % and the third condition is 30 wt. %. In samples 13 to 17, it is confirmed that the color reproduction range hardly changes compared to the comparative example when the second condition is no less than 196 at. % to no more than 203 at. % in the conditions where the first condition is 8 at. % and the third condition is 30 wt. %. In samples 15, 18, and 19, it is confirmed that the color reproduction range decreases significantly when the third condition increases in the conditions where the first condition is 8 at. % and the second condition is 200 at. %. In these conditions, it is confirmed that the color reproduction range is 90 when the third condition is 80 wt. %. Accordingly, in these conditions, it is considered that the color reproduction range is less than 90 when the third condition is more than 80 wt. %. Thus, in these conditions, it is confirmed that a PDP with the third condition of more than 80 wt. % is not preferable.

[5-3. Evaluation of Afterglow Characteristics]

As shown in Table 2, samples 12 to 20 have an afterglow time of 3 ms or less and thus are preferable. Samples 18 to 20 have an afterglow time of shorter than 2 ms and thus are more preferable. In samples 12 to 20, it is confirmed that the afterglow time is 3 ms or less when $Y_3(Al_{0.8},Ga_{0.2})_5O_{12}$:Ce is mixed and the first condition is 8 at. % or more. In samples 15 and 20, it is confirmed that the afterglow time decreases significantly when the first condition increases in the conditions where the second condition is 200 at. % and the third condition is 30 wt. %. In samples 13 to 17, it is confirmed that the afterglow time is 3 ms or less when the second condition is no less than 196 at. % to no more than 203 at. % in the conditions where the first condition is 8 at. % and the third condition is 30 wt. %. In samples 15, 18 and 19, it is confirmed that the afterglow time decreases significantly when the third condition increases in the conditions where the first condition is 8 at. % and the second condition is 200 at. %. Thus, it is preferable that the mixing ratio of $Y_3(Al_{0.8},Ga_{0.2})_5O_{12}$:Ce is greater, from the viewpoint of afterglow characteristics.

[5-4. Evaluation of Discharge Characteristics]

As shown in Table 2, samples 11, and 14 to 20 have an address voltage of +1 V or less and thus are preferable. Samples 14 to 20 have an address voltage of −1 V or less and thus are more preferable. In samples 15 and 20, it is confirmed that the address voltage decreases when the first condition increases in the conditions where the second condition is 200 at. % and the third condition is 30 wt. %. In samples 13 to 17, it is confirmed that the address voltage is more than +1 V when the second condition is 196 at. % or less in the conditions where the first condition is 8 at. % and the third condition is 30 wt. %. Thus, in these conditions, a PDP with the second condition of 196 at. % or less is not preferable. In these conditions, it is also confirmed that the address voltage is +1 or less when the second condition is no less than 197 at. % to no more than 203 at. %. In samples 15, 18 and 19, it is confirmed that the address voltage decreases significantly when the third condition increases in the conditions where the first condition is 8 at. % and the second condition is 200 at. %. Thus, it is preferable that the mixing ratio of $Y_3(Al_{0.8}, Ga_{0.2})_5O_{12}$:Ce is greater, from the viewpoint of discharge characteristics.

[5-5. Comprehensive Evaluation]

As shown in Table 2, samples 14 to 16 and 18 to 20 can decrease the afterglow time to 3 ms or less, while making the luminance to 90 or more and the color reproduction range to 90 or more and suppressing the address voltage to the maximum of +1 V. That is, the samples with the first condition of no less than 8 at. % to no more than 10 at. %, the second condition of no less than 197 at. % to no more than 202 at. %, and the third condition of no less than 30 wt. % to no more than 80 wt. % are preferable in practical use. Accordingly, since samples 14 to 16 and 18 to 20 can shorten the afterglow time without significantly decreasing other performances, they can achieve PDP 10 suitable for stereoscopic image display.

Moreover, when at least one of a (Y, Gd)(P, V)$O_4$:Eu phosphor and a $Y_2O_3$:Eu phosphor is included in red phosphor layer 23a and a $BaMgAl_{10}O_{17}$:Eu phosphor is included in blue phosphor layer 23c, all of the afterglow times of red phosphor layer 23a, green phosphor layer 23b, and blue phosphor layer 23c are shortened. As a result, PDP 10 with excellent image display quality of the stereoscopic image display is achieved. Such PDP 10 is useful for an image display device such as a television for three-dimensional image display.

6. Conclusion

PDP 10 in this embodiment includes a front plate, a rear plate facing the front plate, and phosphor layer 23 formed on the rear plate. Phosphor layer 23 includes green phosphor layer 23b containing $Zn_2SiO_4$:Mn and $(Y_{1-X}, Gd_X)_3Al_5O_{12}$:Ce, where $0 \leq X \leq 1$. In $Zn_2SiO_4$:Mn, the amount of Mn is no less than 8 at. % to no more than 10 at. % relative to the total amount of Zn and Mn. Also, in $Zn_2SiO_4$:Mn, the total amount of Zn and Mn is no less than 197 at. % to no more than 202 at. % relative to the amount of Si. The amount of $(Y_{1-X}, Gd_X)_3Al_5O_{12}$:Ce is no less than 20 wt. % to no more than 50 wt. % relative to the total amount of $Zn_2SiO_4$:Mn and $(Y_{1-X}, Gd_X)_3Al_5O_{12}$:Ce.

According to this configuration, it is possible to shorten the afterglow time without significantly decreasing other performances.

Also, it is preferable that, in PDP 10 in this embodiment, $Zn_2SiO_4$:Mn has an average diameter greater than that of $(Y_{1-X}, Gd_X)_3Al_5O_{12}$:Ce.

This results in a relative improvement in the luminance of PDP 10.

In another embodiment, green phosphor layer 23 of PDP 10 may include green phosphor layer 23b containing $Zn_2SiO_4$:Mn and $(Y_{1-x}, Gd_x)_3(Al_{1-y}, Ga_y)_5O_{12}$:Ce, where $0 \leq x \leq 1$ and $0 \leq y \leq 0.5$. In this case, in $Zn_2SiO_4$:Mn, the amount of Mn is no less than 8 at. % to no more than 10 at. % relative to the total amount of Zn and Mn. Also, in $Zn_2SiO_4$:Mn, the total amount of Zn and Mn is no less than 197 at. % to no more than 202 at. % relative to the amount of Si. The amount of $(Y_{1-x}, Gd_x)_3(Al_{1-y}, Ga_y)_5O_{12}$:Ce is no less than 30 wt. % to no more than 80 wt. % relative to the total amount of $Zn_2SiO_4$:Mn and $(Y_{1-x}, Gd_x)_3(Al_{1-y}, Ga_y)_5O_{12}$:Ce.

According to this configuration, it is possible to shorten the afterglow time without significantly decreasing other performances.

Also, it is preferable that, in PDP 10 in this embodiment, $Zn_2SiO_4$:Mn has an average diameter greater than that of $(Y_{1-x}, Gd_x)_3(Al_{1-y}, Ga_y)_5O_{12}$:Ce.

This results in a relative improvement in the luminance of PDP 10.

INDUSTRIAL APPLICABILITY

According to the PDP of the present invention, there is provided a PDP that achieves the high grade video display quality, which is useful for a stereoscopic image display device with a large screen.

REFERENCE MARKS IN THE DRAWINGS

10 PDP
11 Front substrate
12 Scan electrode
12a, 13a Transparent electrode
12b, 13b Bus electrode
13 Sustain electrode
14 Display electrode
15 Dielectric layer
16 Protective layer
17 Rear substrate
18 Data electrode
19 Base dielectric layer
22 Barrier rib 22a Longitudinal barrier rib
22b Lateral barrier rib
23 Phosphor layer
23a Red phosphor layer
23b Green phosphor layer
23c Blue phosphor layer
24 Discharge cell

The invention claimed is:

1. A plasma display panel comprising:
   a front plate;
   a rear plate facing the front plate; and
   a phosphor layer formed on the rear plate, the phosphor layer including a green phosphor layer containing $Zn_2SiO_4$:Mn and $(Y_{1-X}, Gd_X)_3Al_5O_{12}$:Ce, where $0 \leq X \leq 1$, wherein
   in the $Zn_2SiO_4$:Mn, an amount of Mn is no less than 8 atomic % (at. %) to no more than 10 at. % relative to a total amount of Zn and Mn, and the total amount of Zn and Mn is no less than 197 at. % to no more than 202 at. % relative to an amount of Si, and
   an amount of the $(Y_{1-X}, Gd_X)_3Al_5O_{12}$:Ce is no less than 20 wt. % to no more than 50 wt. % relative to a total amount of the $Zn_2SiO_4$:Mn and the $(Y_{1-X}, Gd_X)_3Al_5O_{12}$:Ce.

2. The plasma display panel according to claim 1, wherein the $Zn_2SiO_4$:Mn has an average diameter at least equal to that of the $(Y_{1-X}, Gd_X)_3Al_5O_{12}$:Ce.

3. A plasma display panel comprising:
   a front plate;
   a rear plate facing the front plate; and
   a phosphor layer formed on the rear plate, the phosphor layer including a green phosphor layer containing $Zn_2SiO_4$:Mn and $(Y_{1-x}, Gd_x)_3(Al_{1-y}, Ga_y)_5O_{12}$:Ce, where $0 \leq x \leq 1$ and $0 \leq y \leq 0.5$, wherein
   in the $Zn_2SiO_4$:Mn, an amount of Mn is no less than 8 at. % to no more than 10 at. % relative to a total amount of Zn and Mn, and the total amount of Zn and Mn is no less than 197 at. % to no more than 202 at. % relative to an amount of Si, and
   an amount of the $(Y_{1-x}, Gd_x)_3(Al_{1-y}, Ga_y)_5O_{12}$:Ce is no less than 30 wt. % to no more than 80 wt. % relative to a total amount of the $Zn_2SiO_4$:Mn and the $(Y_{1-x}, Gd_x)_3(Al_{1-y}, Ga_y)_5O_{12}$:Ce.

4. The plasma display panel according to claim 3, wherein the $Zn_2SiO_4$:Mn has an average diameter at least equal to that of the $(Y_{1-x}, Gd_x)_3(Al_{1-y}, Ga_y)_5O_{12}$:Ce.

5. A plasma display panel manufacturing method comprising:
   providing a front substrate and a rear substrate;
   forming scan electrodes and sustain electrodes on the front substrate;
   forming data electrodes on the rear substrate;
   forming a phosphor layer on the rear substrate, wherein:
      the phosphor layer includes a green phosphor layer containing $Zn_2SiO_4$:Mn and $(Y_{1-X}, Gd_X)_3Al_5O_{12}$:Ce, where $0 \leq X \leq 1$;
      in the $Zn_2SiO_4$:Mn, an amount of Mn is no less than 8 atomic % (at. %) to no more than 10 at. % relative to a total amount of Zn and Mn, and the total amount of Zn and Mn is no less than 197 at. % to no more than 202 at. % relative to an amount of Si, and
      an amount of the $(Y_{1-X}, Gd_X)_3Al_5O_{12}$:Ce is no less than 20 wt. % to no more than 50 wt. % relative to a total amount of the $Zn_2SiO_4$:Mn and the $(Y_{1-X}, Gd_X)_3Al_5O_{12}$:Ce; and
   assembling the front substrate and the rear substrate to be joined together.

6. The plasma display panel manufacturing method according to claim 5, wherein in said forming the phosphor layer, the $Zn_2SiO_4$:Mn is provided to have an average diameter at least equal to that of the $(Y_{1-X}, Gd_X)_3Al_5O_{12}$:Ce.

7. A plasma display panel manufacturing method comprising:
   providing a front substrate and a rear substrate;
   forming scan electrodes and sustain electrodes on the front substrate;
   forming data electrodes on the rear substrate;
   forming a phosphor layer on the rear substrate, wherein:
      the phosphor layer including a green phosphor layer containing $Zn_2SiO_4$:Mn and $(Y_{1-x}, Gd_x)_3(Al_{1-y}, Ga_y)_5O_{12}$:Ce, where $0 \leq x \leq 1$ and $0 \leq y \leq 0.5$;
      in the $Zn_2SiO_4$:Mn, an amount of Mn is no less than 8 at. % to no more than 10 at. % relative to a total amount of Zn and Mn, and the total amount of Zn and Mn is no less than 197 at. % to no more than 202 at. % relative to an amount of Si; and
      an amount of the $(Y_{1-x}, Gd_x)_3(Al_{1-y}, Ga_y)_5O_{12}$:Ce is no less than 30 wt. % to no more than 80 wt. % relative to a total amount of the $Zn_2SiO_4$:Mn and the $(Y_{1-x}, Gd_x)_3(Al_{1-y}, Ga_y)_5O_{12}$:Ce; and
   assembling the front substrate and the rear substrate to be joined together.

8. The plasma display panel manufacturing method according to claim 7, wherein in said forming the phosphor layer, the $Zn_2SiO_4$:Mn is provided to have an average diameter at least equal to that of the $(Y_{1-x}, Gd_x)_3(Al_{1-y}, Ga_y)_5O_{12}$:Ce.

* * * * *